United States Patent Office 3,008,986
Patented Nov. 14, 1961

---

3,008,986
ODOR-CONTROLLED SODIUM PROPIONATE-SODIUM DIPROPIONATE COMPOSITION
Archibald Miller Hyson, Wilmington, Del., assignor to E. I. du Pont de Nemours and Company, Wilmington, Del., a corporation of Delaware
No Drawing. Filed May 26, 1959, Ser. No. 815,777
2 Claims. (Cl. 260—540)

This invention relates to sodium propionate-sodium dipropionate compositions having controlled odor. The invention also relates to a process for preparation of sodium propionate containing a minor quantity of sodium dipropionate, said quantity being so controlled that it does not impart odor to the mixture.

Sodium propionate is used widely in the baking industry for the prevention of mold development in bread, pastries, and other baked goods. As normally manufactured, the sodium propionate possesses a propionic acid odor, particularly after a few hours or days in a closed container. If the propionic acid used to prepare the sodium propionate contains other fatty acids, such as butyric, valeric, etc., the product may also possess the odor of these higher acids. The odor of propionic acid and other volatile fatty acids is objectionable to many people who must handle sodium propionate in bakeries and other areas where it is used. This invention provides a method for producing sodium propionate essentially free of volatile fatty acid odor. Generally speaking, the odor is caused by the dissociation of sodium dipropionate which builds up an equilibrium vapor pressure of propionic acid.

An object of this invention is the preparation of sodium propionate containing controlled low concentrations of sodium dipropionate or double salts of sodium propionate and other volatile fatty acids. Other objects of the invention will appear hereinafter.

Sodium dipropionate, as mentioned above, is responsible for propionic acid odor in sodium propionate and is a compound of definite chemical composition having the formula shown below.

$$CH_3CH_2CO_2Na \cdot HO_2CCH_2CH_3$$

Sodium dipropionate decomposes at a detectable rate at a temperature of approximately 85° C. and decomposes rapidly at a temperature of 140° C., or above, to form sodium propionate and propionic acid. At 140° C. and above, the propionic acid formed via this decomposition is rapidly vaporized.

The present invention provides a method for controlling the content of propionic acid and other volatile alkanoic acids by adjusting the pH of the solution from which sodium propionate is isolated, to a pH of from 8.5 to 11, which is a range of pH at which free propionic acid is present. Drying the resulting mixture produces a crystalline solid containing 5 to 100 p.p.m. of sodium dipropionate.

The invention is illustrated further by means of the following example.

EXAMPLE 1

To a solution of propionic acid in water was added sufficient sodium hydroxide to adjust the pH of the solution to the levels specified in Table I, when measured potentiometrically at 25° C. with standard electrodes using samples diluted to a solids content of 10%. The concentration of sodium propionate in the solution can be varied from 10% to the point of saturation, but in these experiments the concentration was from 40% to 60%. Solid sodium propionate was isolated from the solution by flashing off the water and free propionic acid on hot rolls at about 170° C. The solid product was then treated with a blast of hot air at a temperature above 140° C. to further reduce the moisture and propionic acid content. The concentration of sodium dipropionate in the sodium propionate was also reduced by this treatment due to decomposition of the sodium dipropionate and volatilization of propionic acid. When the pH of the solution from which the solid sodium propionate is isolated is above 8.5, only minor quantities of residual sodium dipropionate remain in the solid sodium propionate and these amounts are further reduced by contact with hot air at a temperature above 140° C. Sodium propionate prepared in this manner is free of or possesses only an extremely low odor of propionic acid. The effect of the above described treatment on the odor level of sodium propionate and its sodium dipropionate content is reported in the table.

The method for measuring the quantity of sodium dipropionate was as follows:

A 25 g. sample of sodium propionate was placed in a large test tube containing a nitrogen inlet tube extending to the bottom of the test tube. The test tube and contents were placed in a heated block maintained at a temperature of 150° C. A stream of nitrogen was passed through the inlet tube and thus through the sodium propionate at a rate of 7 liters/hour for a period of 4 hours. Little if any additional acid was evolved by longer heating. The exit gases were scrubbed by cold water (0° C.), and the volatile acid which was collected was titrated with standard alkali. The concentrations of sodium dipropionate present in the samples were calculated and are shown in Table I.

Odor comparison tests by four individual persons were made on the same samples of sodium propionate which were analyzed for sodium dipropionate and the results are also listed in Table I. The rating numbers increase with increasing undesirable odor, No. 1 representing the lowest odor level and 11 representing the highest. Table I also lists the pH of the feed solutions of sodium propionate as well as the pH of the solid products, measured in 10% solution in water.

Table I
ANALYSES, ODOR RATINGS AND pH MEASUREMENTS

| pH of aqueous solution | pH of solid sodium propionate | Identification of solid | Rating Individual [1] | | | | Average | P.p.m. of sodium dipropionate |
|---|---|---|---|---|---|---|---|---|
| | | | A | B | C | D | | |
| 9.8 | 11.0 | Experimental sample from drum dryer | 1 | 2 | 4 | 4 | 2.7 | 11 |
| 8.7 | 9.4 | ...do... | 3 | 4 | 2 | 8 | 4.2 | 34 |
| 9.1 | 9.2 | ...do... | 4 | 3 | 1 | 2 | 2.5 | 37 |
| 8.2 | 9.1 | ...do... | 2 | 1 | 8 | 3 | 3.5 | 130 |
| 7.6 | 8.8 | ...do... | 8 | 10 | 9 | 11 | 9.5 | 102 |
| ----- | 8.8 | Commercial sample | 11 | 8 | 10 | 9 | 9.5 | 460 |
| ----- | 8.5 | ...do... | 9 | 11 | 11 | 10 | 10.2 | 136 |
| 7.3 | 8.5 | Experimental sample from drum dryer | 6 | 7 | 3 | 6 | 5.5 | 197 |
| 8.2 | 9.4 | Experimental sample from drying rolls | 10 | 6 | 7 | 7 | 7.5 | 391 |
| 8.7 | 9.3 | ...do... | 7 | 9 | 6 | 5 | 6.7 | 72 |
| 9.1 | 9.2 | ...do... | 5 | 5 | 5 | 1 | 4.0 | 70 |
| 11.0 | 12.0 | | -- | -- | -- | -- | ---- | ([2]) |

[1] A, B, C, and D are specific persons who took part in the subjective tests and who assigned ratings based on amount of undesirability in the odor of the product under examination.

[2] About 5.

It is to be understood that the foregoing example is illustrative only and that numerous methods of practicing the invention will occur to those who are skilled in the art. The flashing off of the water and propionic acid can be performed in any suitable apparatus, at any temperature above about 100° C. The heating of the dried solid product is usually performed at a temperature of 140° to 200° C., and may be continued until no further decrease in odor is detectable. If desired, sodium carbonate can be used in place of sodium hydroxide in the method of Example 1. It is also possible to use various expedients for reducing the amount of volatile material to be removed by vaporization, e.g. by producing a precipitate through chilling in a continuous crystallizer, or by precipitating by adding a suitable water soluble organic liquid. However, the preferred method is the method described in the example.

The products of the invention are highly useful as additives for foods to produce a fungistatic effect. These products are especially valuable in manufacturing baked foods, such as cakes, bread, etc., where undesirable odor in the packaged fungistatic agent is to be avoided.

I claim:

1. A process for preparing sodium propionate containing 5 to 100 p.p.m. of the double salt of sodium propionate and a volatile fatty acid which consists of adjusting the pH of aqueous sodium propionate to 8.5 to 11.0, flashing off water and propionic acid therefrom, drying the resulting mixture at a temperature of at least 100° C., whereby a propionic acid-free product is obtained.

2. A process for preparing sodium propionate containing 5 to 100 p.p.m. of a double salt of sodium propionate and a volatile fatty acid which consists of adjusting the pH of an aqueous solution of sodium propionate to a pH of 8.5 to 11.0, flashing off the water and propionic acid therefrom, drying the resulting mixture at a temperature of at least 100° C., whereby a propionic acid-free product is obtained, and further heating the resulting mixture at 140° to 200° C. until no further decrease in odor is detectable.

References Cited in the file of this patent

UNITED STATES PATENTS 2,895,990    Larrison et al. ---------- July 21, 1959

OTHER REFERENCES

Osol et al.: Dispensatory of the United States of America, 25th ed., 1955, J. B. Lippincott Co., Philadelphia, Pt. I Mannitol Injection to Zinc Undecylenate, page 1290.